(12) United States Patent
Skarsgard et al.

(10) Patent No.: US 12,508,008 B2
(45) Date of Patent: Dec. 30, 2025

(54) APPARATUS AND METHODS FOR THE DELIVERY OF BIOCOMPATIBLE MATERIALS

(71) Applicant: VESALIUS CARDIOVASCULAR INC., Vancouver (CA)

(72) Inventors: Peter Lloyd Skarsgard, Vancouver (CA); Andrew Meyer, Vancouver (CA); Ryan Harrington, Vancouver (CA)

(73) Assignee: VESALIUS CARDIOVASCULAR INC., Vancouver (CA)

( * ) Notice: Subject to any disclaimer, the term of this patent is extended or adjusted under 35 U.S.C. 154(b) by 0 days.

(21) Appl. No.: 18/436,178

(22) Filed: Feb. 8, 2024

(65) Prior Publication Data

US 2024/0268804 A1 Aug. 15, 2024

Related U.S. Application Data

(60) Provisional application No. 63/484,465, filed on Feb. 10, 2023.

(51) Int. Cl.
*A61B 17/00* (2006.01)
*A61B 17/34* (2006.01)

(52) U.S. Cl.
CPC ........ *A61B 17/00234* (2013.01); *A61B 17/34* (2013.01); *A61B 2017/00243* (2013.01); *A61B 2017/3488* (2013.01)

(58) Field of Classification Search
CPC .............. A61B 17/00234; A61B 17/34; A61B 2017/00243; A61B 2017/3488
See application file for complete search history.

(56) References Cited

U.S. PATENT DOCUMENTS

| 5,148,578 A | 9/1992 | Clarke et al. |
| 7,027,851 B2 | 4/2006 | Mejia |
| 8,652,202 B2 | 2/2014 | Alon et al. |
| 9,044,221 B2 | 6/2015 | Zentgraf et al. |
| 9,295,553 B2 | 3/2016 | Padala et al. |

(Continued)

FOREIGN PATENT DOCUMENTS

| WO | 2003037227 A2 | 5/2003 |
| WO | 2013037805 A1 | 3/2013 |

(Continued)

*Primary Examiner* — Lynsey C Eiseman
*Assistant Examiner* — Skylar Lindsey Christianson
(74) *Attorney, Agent, or Firm* — Oyen Wiggs Green & Mutala LLP

(57) ABSTRACT

An apparatus and methods for the delivery of biocompatible materials such as anchors. The apparatus comprises an elongated body having a proximal end and an opposing distal end, a supporting arm extending outwardly from the distal end of the body, and a plurality of arms each extending outwardly from the distal end of the body. The plurality of arms may each define an arm lumen therewithin dimensioned to receive the biocompatible material. The apparatus comprises means for selectively moving each one of the plurality of arms relative to the longitudinal axis of the supporting arm between an expanded configuration and a collapsed configuration, and means for selectively deploying the biocompatible materials from within one or more of the arm lumens into a tissue of a subject.

15 Claims, 18 Drawing Sheets

(56) References Cited

U.S. PATENT DOCUMENTS

| | | |
|---|---|---|
| 10,039,531 B2 | 8/2018 | Yoganathan et al. |
| 10,206,673 B2 | 2/2019 | Maisano et al. |
| 10,206,776 B2 | 2/2019 | Alon |
| 10,238,495 B2 | 3/2019 | Marsot et al. |
| 10,856,983 B2 | 12/2020 | Keränen et al. |
| 11,109,972 B2 | 9/2021 | Marsot et al. |
| 2003/0167071 A1 | 9/2003 | Martin et al. |
| 2004/0181238 A1 | 9/2004 | Zarbatany et al. |
| 2005/0004665 A1 | 1/2005 | Aklog |
| 2005/0075727 A1 | 4/2005 | Wheatley |
| 2006/0282083 A1 | 12/2006 | Fanton et al. |
| 2010/0030330 A1 | 2/2010 | Bobo et al. |
| 2010/0049313 A1 | 2/2010 | Alon et al. |
| 2012/0184971 A1 | 7/2012 | Zentgraf et al. |
| 2014/0194716 A1 | 7/2014 | Diep et al. |
| 2015/0045825 A1* | 2/2015 | Caplan ............. A61B 17/12186 606/191 |
| 2015/0162671 A1 | 6/2015 | Hoppmann et al. |
| 2016/0310268 A1* | 10/2016 | Oba ...................... A61F 2/2418 |
| 2016/0367360 A1 | 12/2016 | Cartledge et al. |
| 2018/0116800 A1 | 5/2018 | Alon |
| 2019/0053902 A1 | 2/2019 | Zentgraf et al. |
| 2019/0167407 A1* | 6/2019 | Schaer .................... A61B 6/12 |
| 2019/0240023 A1 | 8/2019 | Spence et al. |
| 2021/0015476 A1 | 1/2021 | Bar et al. |
| 2021/0052387 A1 | 2/2021 | Greenan et al. |

FOREIGN PATENT DOCUMENTS

| | | |
|---|---|---|
| WO | 2015017689 A1 | 2/2015 |
| WO | 2015195823 A1 | 12/2015 |
| WO | 2020146548 A1 | 7/2020 |
| WO | 2020154797 A1 | 8/2020 |
| WO | 2022172108 A1 | 8/2022 |

* cited by examiner

APPARATUS AND METHODS FOR THE DELIVERY OF BIOCOMPATIBLE MATERIALS

FIELD OF THE INVENTION

The invention pertains to apparatuses for the delivery of biocompatible materials, and methods of using such apparatuses to deliver biocompatible materials into tissues of a subject.

BACKGROUND OF THE INVENTION

It is known in the art to use catheters to deliver biocompatible materials into tissues of a subject. For example, it is known in the field of cardiology to use anchor delivery catheters to deliver ventricular anchors in the myocardium in the left ventricle of the heart. It is desirable for an apparatus which can provide for precise, controlled and/or atraumatic delivery of biocompatible materials into a specific implantation location in the subject.

SUMMARY

One aspect of the invention provides an apparatus for the delivery of biocompatible materials, such as ventricular anchors. The apparatus comprises an elongated body having a proximal end and an opposing distal end, a supporting arm extending outwardly from the distal end of the body, and a plurality of steering arms each extending outwardly from the distal end of the body. The plurality of arms may be positioned spaced-apart from the supporting arm. In some embodiments, the plurality of arms is arranged around the supporting arm. The plurality of arms each defines an arm lumen dimensioned to receive the biocompatible material therein. The apparatus comprises means for selectively moving each one of the plurality of steering arms relative to the longitudinal axis of the supporting arm between an expanded configuration and a collapsed configuration, and means for selectively deploying the biocompatible materials from within one or more of the arm lumens into a tissue of a subject.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
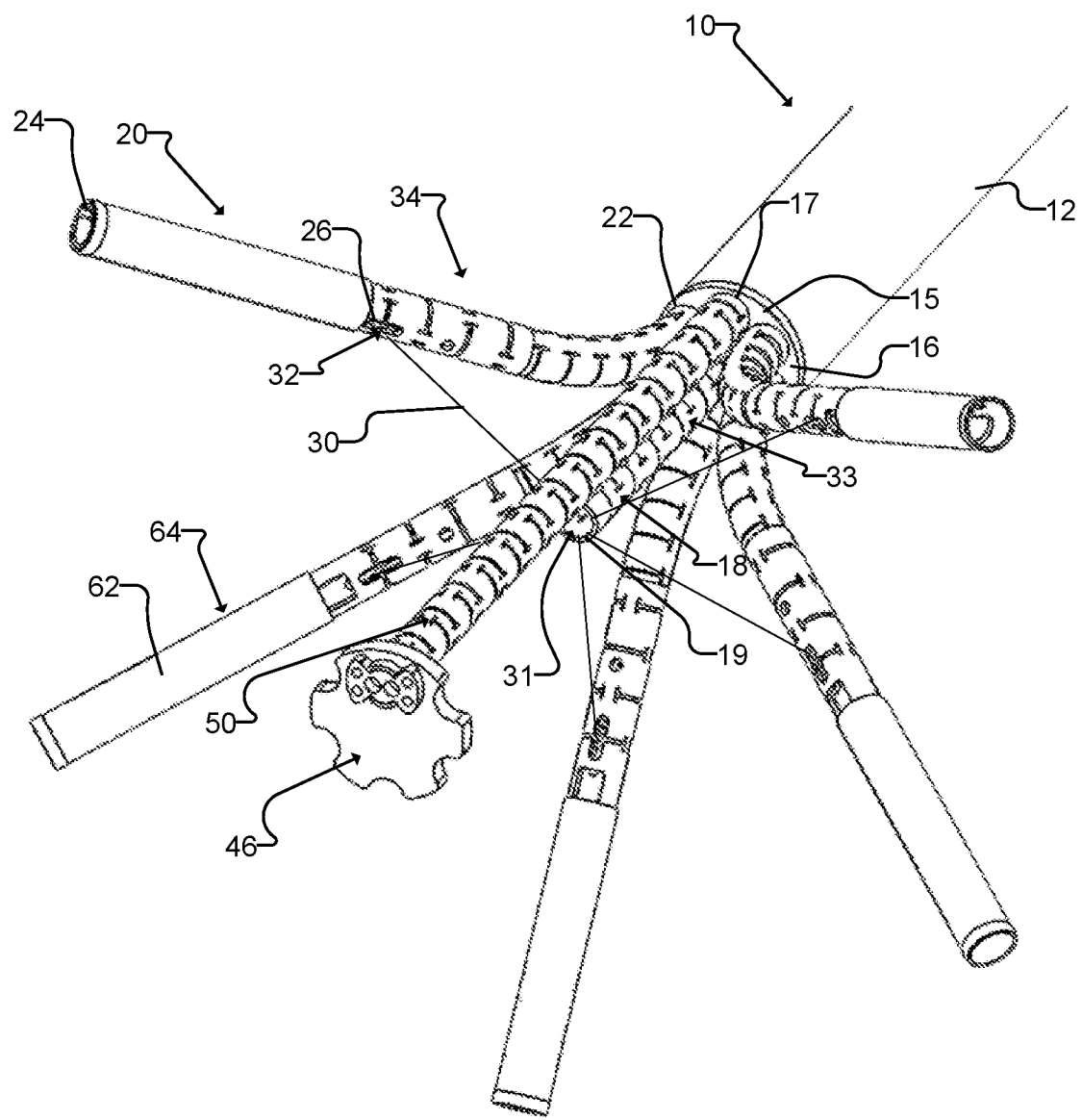
FIG. 1 is a perspective view of an apparatus according to an example embodiment, showing each one of the plurality of arms in an expanded configuration.
Figure 2:
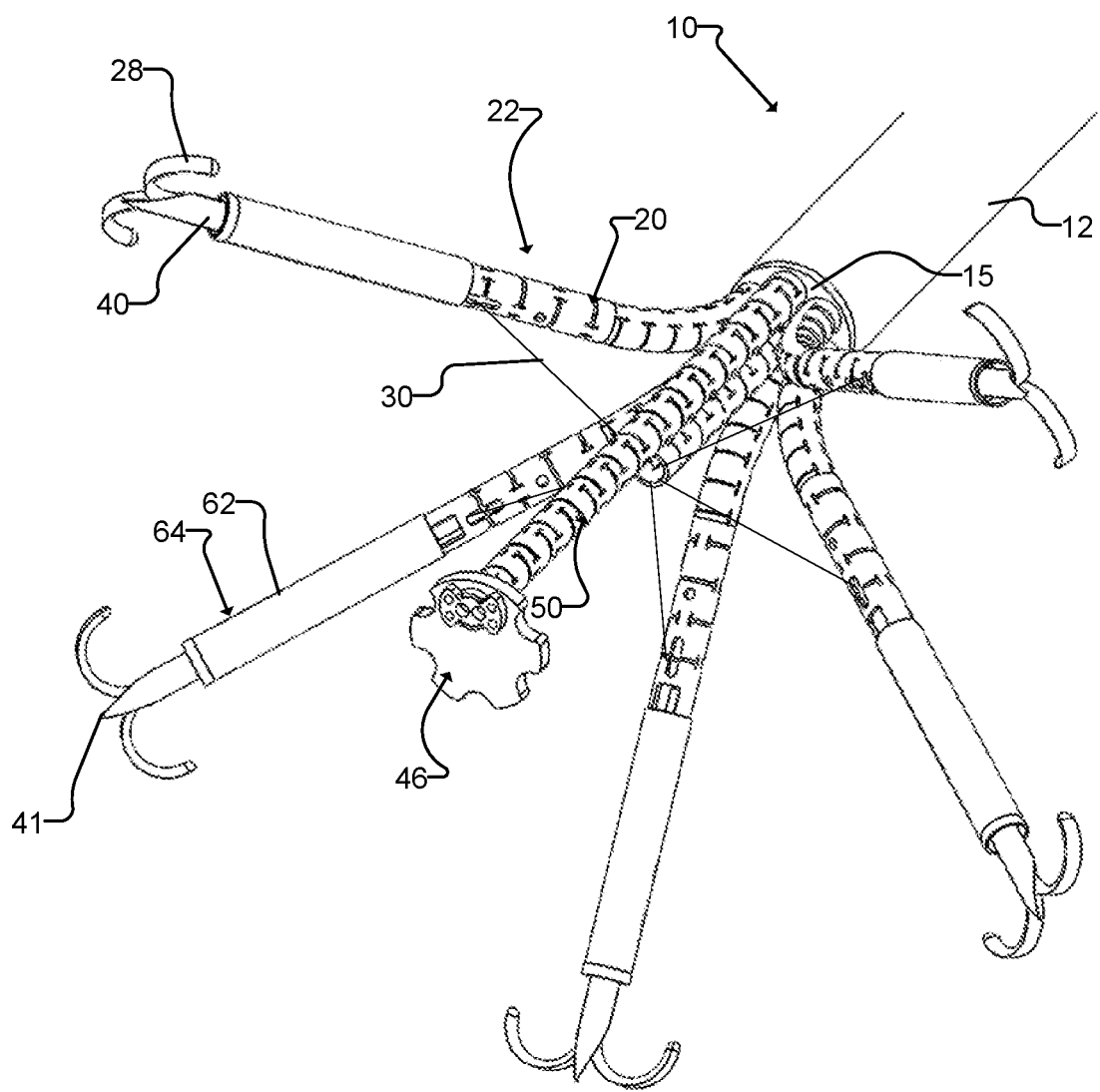
FIG. 2 is a perspective view of the apparatus of FIG. 1, showing the needle and the biocompatible materials deployed from each one of the plurality of arms.

Referring to FIGS. 1-11, in one embodiment, the apparatus of the invention is an apparatus for the delivery of biocompatible materials 10. The apparatus 10 comprises an elongated body 12 having a proximal end (not shown) extending to an opposing distal end 16 along a longitudinal axis of the apparatus 10. The body 12 may be tubular and/or made of a flexible material. In some embodiments, a portion of the body 12 may be received within a lumen of an outer body. The outer body may be tubular and/or made of a flexible material. The bendable body and the outer body (if present) may act as a guide to facilitate the orienting of the apparatus 10 to the desired implantation location in a body of a subject.

As used herein, "proximal" refers to a direction along a longitudinal axis of the apparatus 10, 100 towards a distal end 16, 106 of the elongated body 12, 102, and "distal" refers to a direction along the longitudinal axis of the apparatus 10, 100 away from the distal end 16, 106 of the elongated body 12, 102.

A first supporting arm 18 may be arranged to extend outwardly from the distal end 16 of the body 12. The first supporting arm 18 extends from a proximal end 17 to an opposing distal end 19, the distal end 19 of the first supporting arm 18 being positioned away from the distal end 16 of the body 12. A plurality of steering arms 20 may be arranged to extend outwardly from the distal end 16 of the body 12, from a proximal end 22 of each of the steering arms 20 to a distal end 24 thereof, the distal ends 24 of each of the plurality of steering arms 20 being positioned away from the distal end 16 of the body 12. The steering arms 20 may be positioned spaced-apart from each other and from the first supporting arm 18.

In some embodiments, the arms 20 are arranged around the first supporting arm 18. The steering arms 20 may be spaced circumferentially apart from each other, and radially outwardly from the first supporting arm 18. In some embodiments, the first supporting arm 18 is aligned coaxial with respect to the body 12 along a central longitudinal axis of the apparatus 10.

Figure 3:
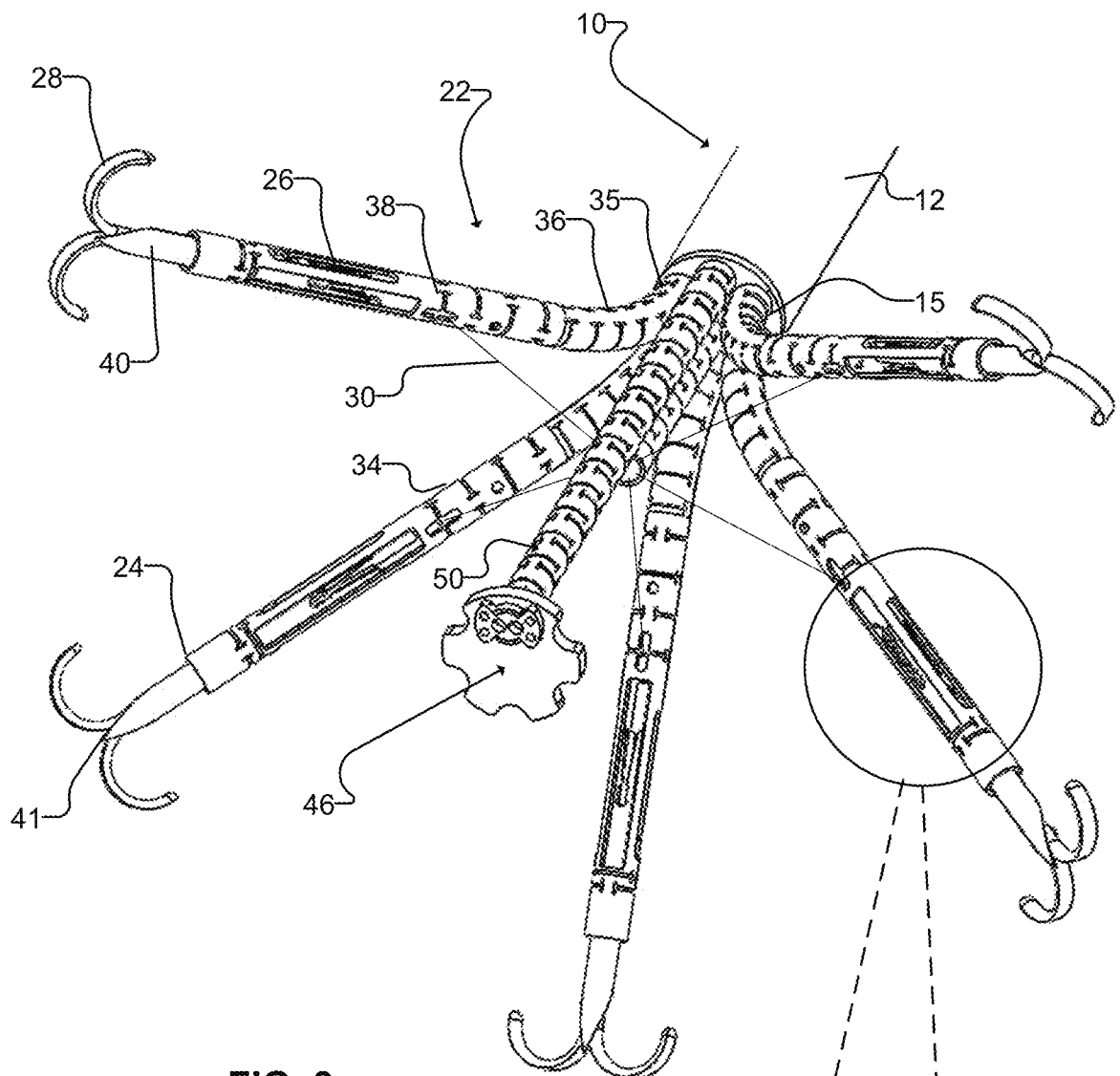
FIG. 3 is a perspective view of the apparatus of FIG. 1, showing the needle and the biocompatible materials deployed from each one of the arms with the arm sleeves removed from the arms.

Referring to FIG. 3, each one of the plurality of arms 20 may define an arm lumen 26 within the arm 20. The arm lumen 26 is dimensioned to receive one or more biocompatible materials 28. An example of biocompatible materials 28 that may be received within the arm lumen 26 are anchors such as ventricular anchors. Ventricular anchors may include annular anchors and papillary anchors. In such example, the ventricular anchors may be delivered to a desired implantation location within a heart of a subject, such as in the mitral annulus of the heart. Other types of biocompatible materials 28 that may be suitable for delivery into tissues of a subject may be received within the arm lumen 26. Another example of such biocompatible materials 28 is pacemaker leads.

Means may be provided to selectively move each one of the plurality of arms 20 between an expanded configuration and a collapsed configuration relative to the longitudinal axis of the first supporting arm 18. Each one of the plurality of arms 20 may be moved to expand or collapse individually (see e.g., FIGS. 5-7). Alternatively, more than one of the plurality of arms 20 may be moved to expand or collapse simultaneously (see e.g., FIGS. 1-3). Each of the plurality of arms 20 may move between a radially expanded configuration in which the steering arm 20 extends radially outwardly from the longitudinal axis of the first supporting arm 18 and a radially collapsed configuration. A movement of each of the plurality of arms 20 between the collapsed configuration and the expanded configuration defines a change in radial distance between the longitudinal axes of the first supporting arm 18 and the respective one of the plurality of arms 20. When the steering arm 20 is in a fully expanded configuration, the steering arm 20 is positioned at a point defined by a maximum radial distance from the longitudinal axis of the steering arm 20 to the longitudinal axis of the first supporting arm 18 (see e.g., FIG. 1). When the steering arm 20 is in a fully collapsed configuration, the steering arm 20 is positioned at a point defined by a minimum radial distance from the longitudinal axis of the arm 20 to the longitudinal axis of the first supporting arm 18 (see e.g., FIG. 10). Each of the arms 20 may be expanded to any point between the minimum and maximum radial distances. In example embodiments, the maximum radial distance is in the range of from about 30° to about 90°, or in the range of from about 40° to about 80°, or in the range of from 50° to 60°. In example embodiments, the minimum radial distance is zero or close to zero. In example embodiments, the steering arm 20 is expanded from about 0° to about 50°.

The one or more plurality of arms 20 may be bendable. In some embodiments, one or more of the plurality of arms 20 comprise a curved portion 36. In such embodiments, the steering arm 20 extends distally from a first straight portion 35 to the curved portion 36, and therefrom extends distally to a second straight portion 38 towards the distal end 24 of the steering arm 20. The degree of curvature of the curved portion 36 is at a maximum when the steering arm 20 is in the fully expanded configuration. When the steering arm 20 is in the fully collapsed configuration, the degree of curvature of the curved portion 36 is close to zero.

In some embodiments, the means to selectively move each one of the plurality of arms 20 comprise a control wire 30. The control wire 30 may be arranged to connect the steering arm 20 to the first supporting arm 18. In some embodiments, a plurality of control wires 30 is provided. Each one of the plurality of control wires 30 connects each one of the plurality of arms 20 to the first supporting arm 18. In some example embodiments, the control wire 30 connects from a point 31 near a distal end 19 of the first supporting arm 18 to a point 32 along a body 34 of the arms 20. The point 31 on the first supporting arm 18 may be on or near the distal end 19, or along a body 33 of the first supporting arm 18 proximal to the distal end 19. The point 32 on the body 34 of the arms 20 may be any position between the proximal 22 and distal 24 ends of the steering arm 20. In some embodiments, the point 32 is closer to the distal end 24 than to the proximal end 22 of the steering arm 20.

Figure 11:
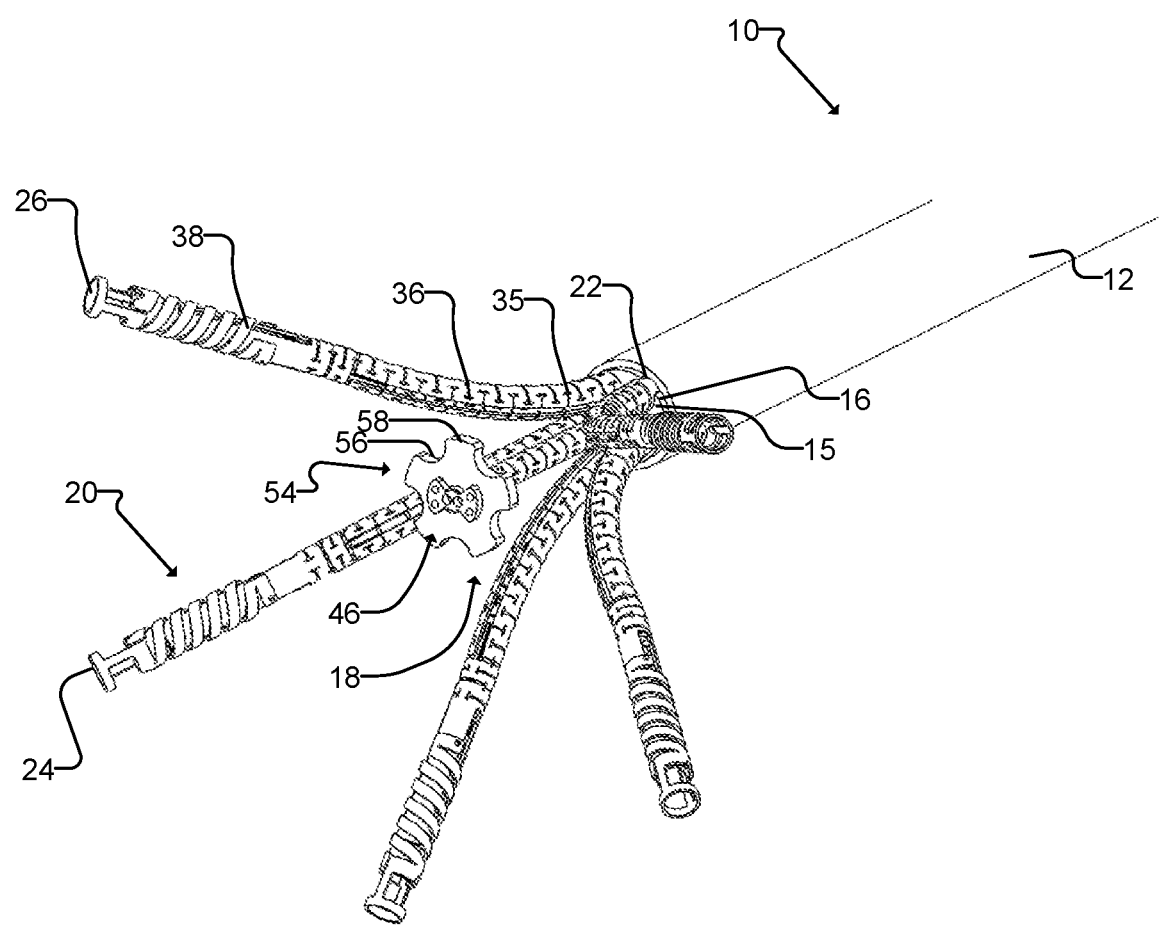
FIG. 11 is a perspective view of an apparatus according to a second example embodiment, showing each one of the plurality of arms in an expanded configuration.
Figure 12:
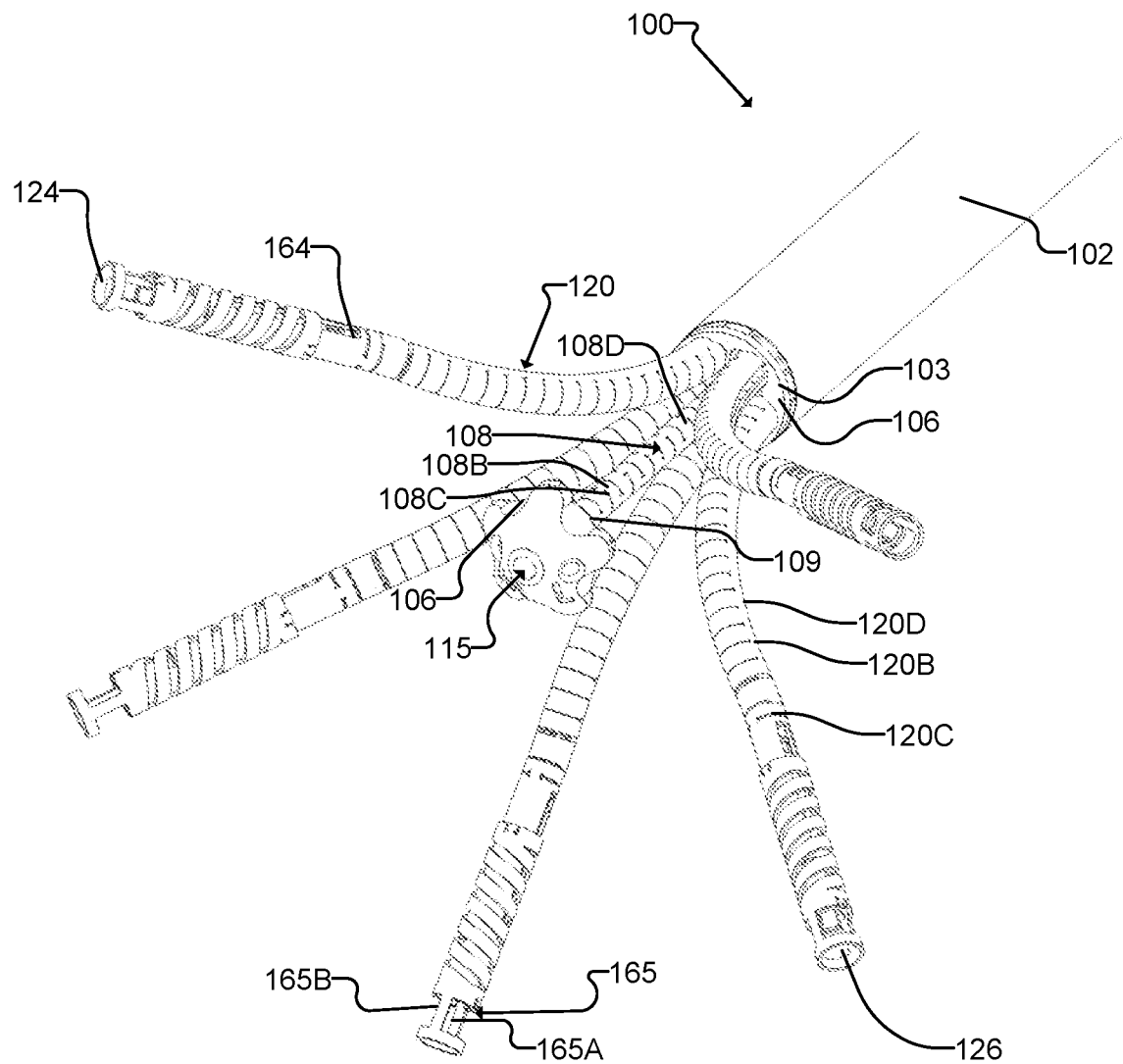
FIG. 12 is a perspective view of an apparatus according to a third example embodiment, showing each one of the plurality of arms in an expanded configuration.

Referring to FIG. 11, in some embodiments, the means to selectively move each one of the plurality of arms 20 comprises an arms actuator positioned near or at the proximal end of the apparatus 10. The arms actuator may be connected to each of the arms 20, configured to control the selective movement of each one of the arms 20.

In some embodiments, a needle 40 is disposed within the arm lumen 26 of one or more of the plurality of arms 20. The needle 40 may be deployable from within the arm lumen 26. In some embodiments, the needle 40 terminates in a needle tip 41, arranged to protrude distally away from the distal end 24 of the steering arm 20 upon deployment. In such embodiments, the one or more biocompatible materials 28 may be deployable from the needle 40. The one or more biocompatible materials 28 are arranged to protrude distally away from the needle tip 41 upon deployment. The needle tip 41 facilitates the precise delivery of the one or more biocompatible materials 28 to the desired implantation location(s) within the tissues of a subject.

Means may be provided to selectively deploy the needle 40 and/or biocompatible material 28 from within one or more of the arm lumens 26 of the steering arm 20 into a tissue of a subject. The needle 40 and the biocompatible material 28 may be deployed simultaneously or sequentially. In some embodiments, the needle 40 is deployed before the biocompatible material 28. Such deployment means may for example comprise a mechanical deployment mechanism In some embodiments, the mechanical deployment mechanism is connectable to a control device such as a monitor and/or processor for monitoring and/or controlling the deployment. The control device may be positioned at or near the proximal end of the apparatus 10. In some embodiments, the mechanical deployment mechanism comprises a needle actuator. The needle actuator may be controlled by the control device. In some embodiments, actuation of the actuator advances the needle 40 and the biocompatible material 28 from within one or more of the arm lumens 26.

Figure 8A:
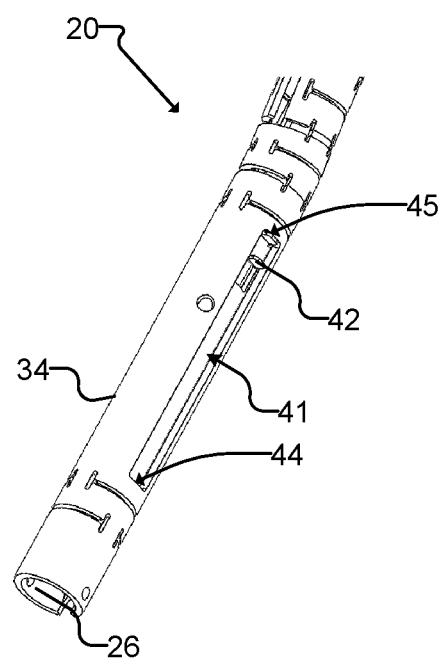
FIG. 8A is a perspective view illustrating an arm of the FIG. 1 apparatus with the needle retracted within the arm lumen.
Figure 8B:
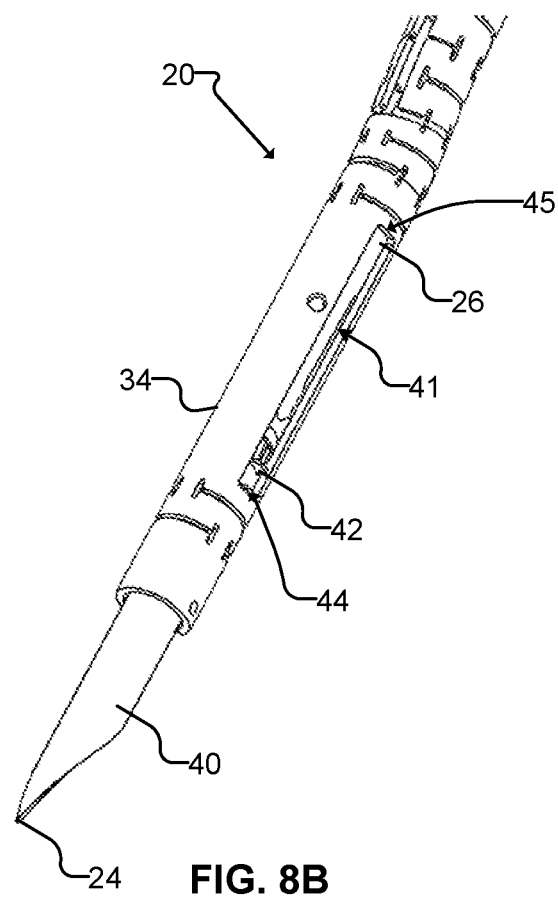
FIG. 8B is a perspective view illustrating an arm of the FIG. 1 apparatus showing the needle deployed from within the arm lumen.

Referring to FIGS. 8A and 8B, means may be provided to control the depth of protrusion of the needle 40. Such means may comprise means to restrict movement of the needle 40 within the arm lumen 26 so as to prevent the needle 40 from being protruded beyond a selected depth. In some embodiments, such means comprise a stopper 42 projecting outwardly from the needle 40. The stopper 42 may be arranged to project outwardly from within the body 34 of the steering arm 20. The stopper 42 may be shaped to engage with a slot 41 defined on the steering arm 20. In the illustrated embodiments, the stopper 42 may slide along the slot 41 of the steering arm 20 from a first point 44 to a second point 45, so as to restrict further distal movement of the needle 40 within the arm lumen 26 beyond the point 45.

Figure 9A:
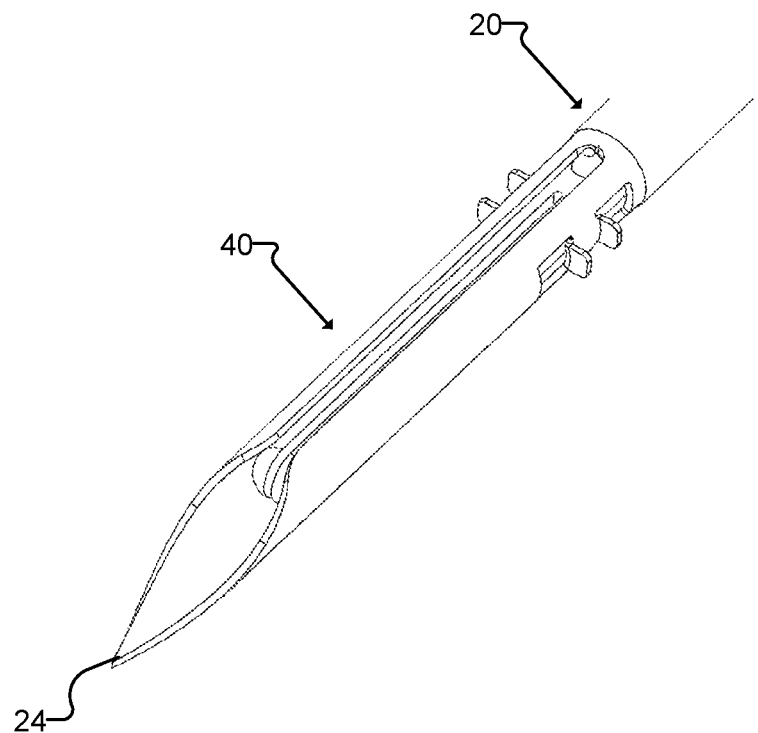
FIG. 9A is a perspective view illustrating the needle of the arm of the FIG. 1, showing a biocompatible material retracted within the arm lumen.
Figure 9B:
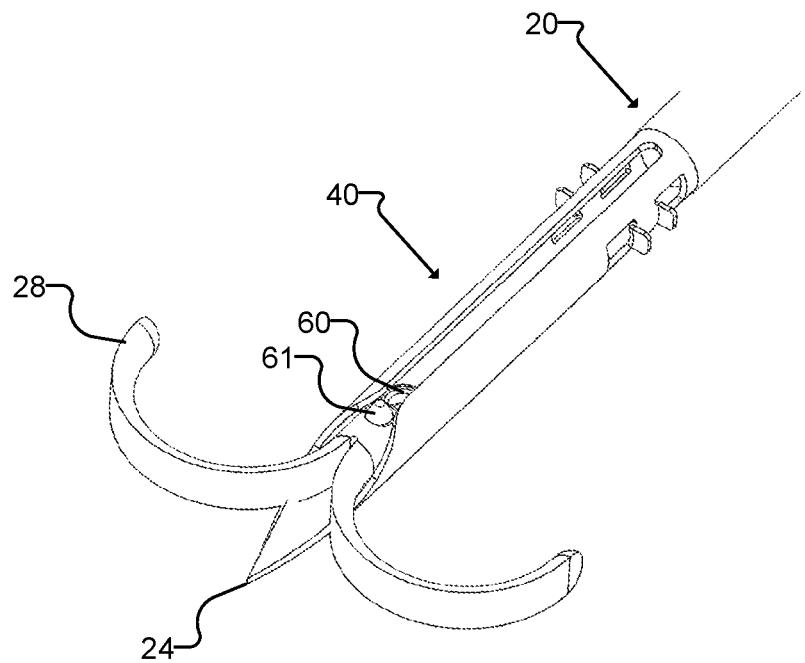
FIG. 9B is a perspective view illustrating the needle of the arm of the FIG. 1, showing a biocompatible material deployed from within the arm lumen.

In some embodiments, as shown in FIGS. 9A and 9B, an alignment slot 60 is defined along the needle 40 dimensioned to receive one or more of the biocompatible materials 28. In some embodiments, the biocompatible material 28 comprises a corresponding projected portion 61 slideably receivable within the alignment slot 60. The alignment slot 60 facilitates proper alignment of the biocompatible material 28 in the needle 40 thereby securing the biocompatible material 28 therein until deployment and/or allowing for precise deployment into the desired implantation location(s) of the tissues.

Figure 5:
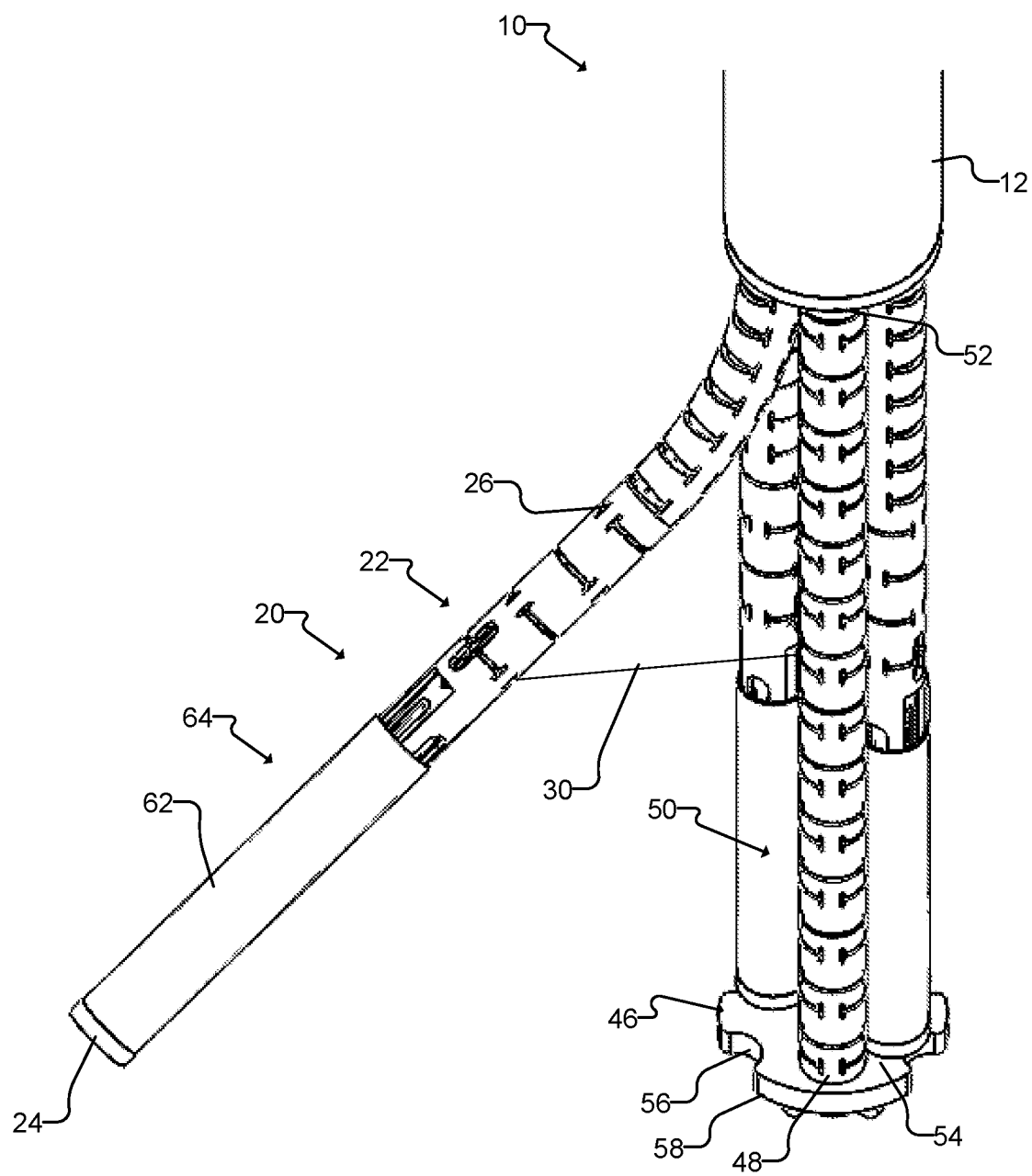
FIG. 5 is a perspective view of the apparatus of FIG. 1, showing a selected one of the plurality of arms in the expanded configuration.
Figure 6:
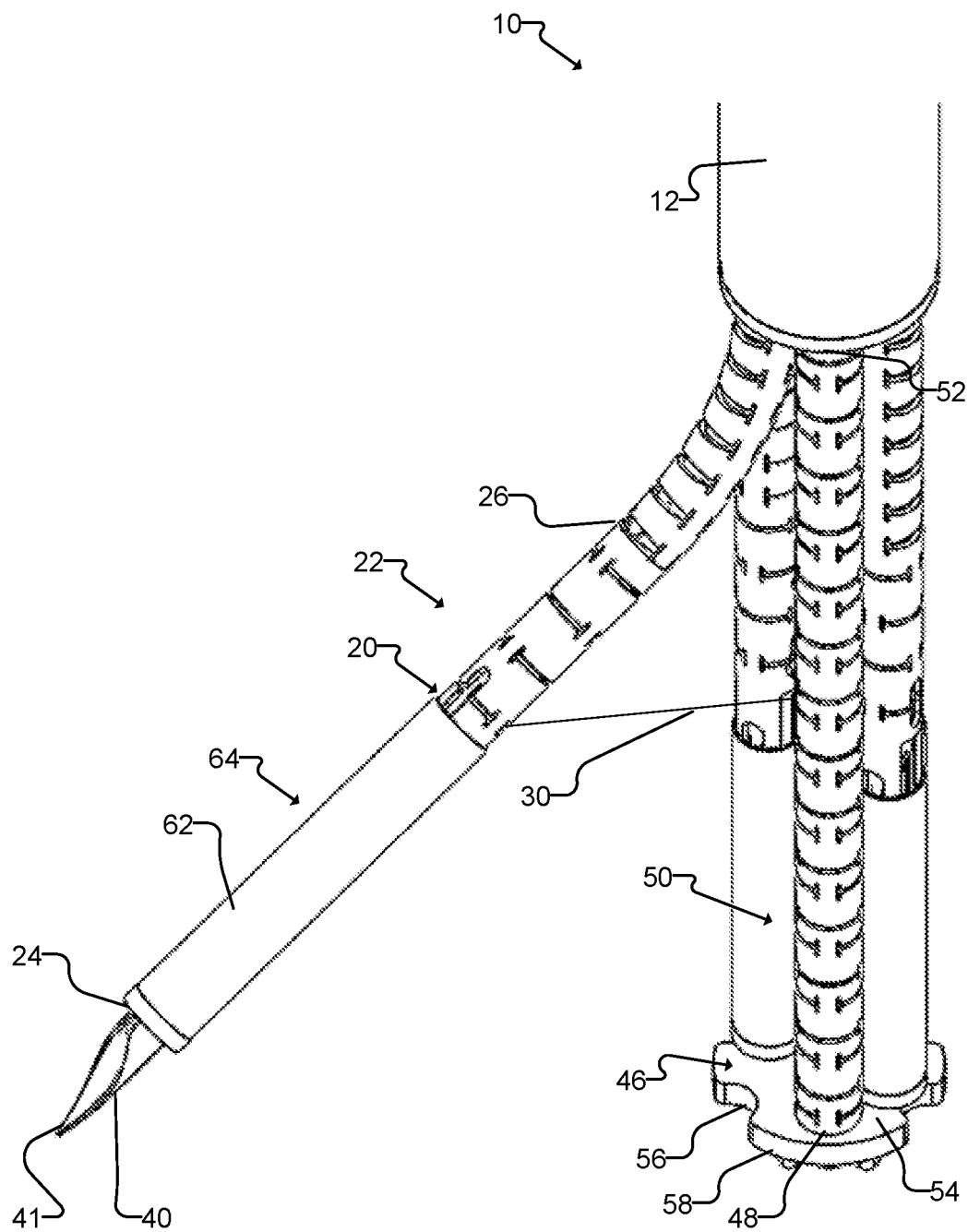
FIG. 6 is a perspective view of the apparatus of FIG. 1, showing a needle deployed from the selected one of the arms.
Figure 7:
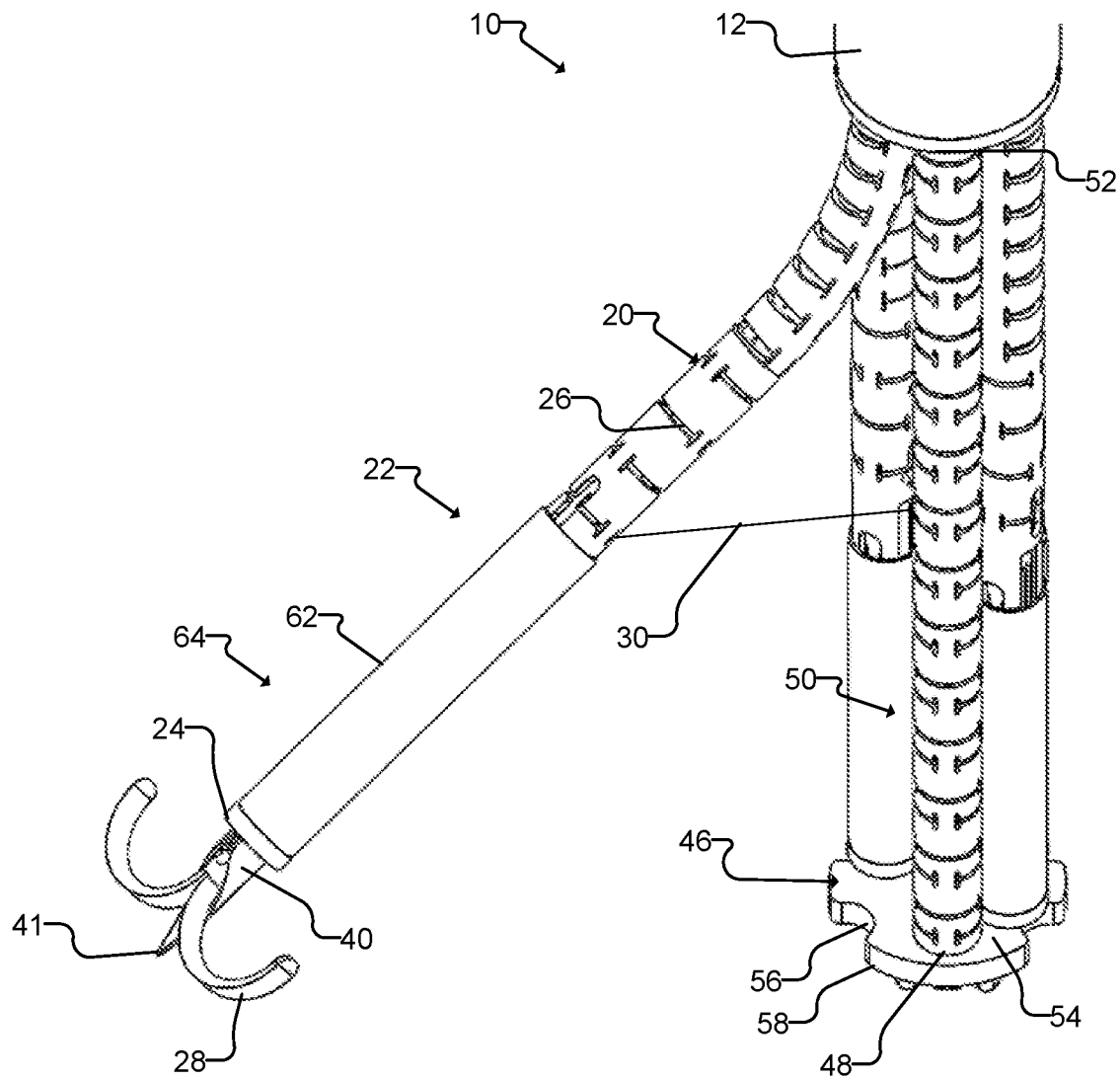
FIG. 7 is a perspective view of the apparatus of FIG. 1, showing the needle and the biocompatible material deployed from the selected one of the arms.

Referring to FIGS. 5-7, the apparatus 10 may further comprise a tip protector 46 arranged to provide a cover for the distal ends 24 of each of the arms 20 when the steering arm 20 is in the fully compressed configuration. The tip protector 46 may be positioned to contact the distal end 24 of the steering arm 20, or positioned spaced-apart distally from the distal end 24 of the steering arm 20.

In some embodiments, the tip protector 46 is secured to a distal end 48 of a second supporting arm 50. In such embodiments, the second supporting arm 50 extends outwardly from the distal end 16 of the body 12 of the apparatus 10, extending distally from a proximal end 52 to the opposing distal end 48. The second supporting arm 50 and the arms 20 may be arranged around the first supporting arm 18. In some embodiments, the second supporting arm 50 is positioned radially outwardly from the first supporting arm 18, and spaced circumferentially apart from the arms 20.

In alternative embodiments, as shown in FIG. 11, the tip protector 46 is secured to the distal end 19 of the first supporting arm 18. In some embodiments, the first supporting arm 18 comprises a length substantially equal to a length of each of the arms 20.

In some example embodiments, the tip protector 46 comprises a plate 54 having one or more end-receiving slots 56 formed along an outer circumferential edge 58 of the plate 54. Each of the end-receiving slots 56 is arranged to align the distal end 24 of the respective one of the arms 20. In other example embodiments, the tip protector 46 comprises an end cap (not shown) defining a plurality of cavities. Each of the cavities may be dimensioned to receive the distal end 24 of the respective one of the arms 20.

Figure 10:
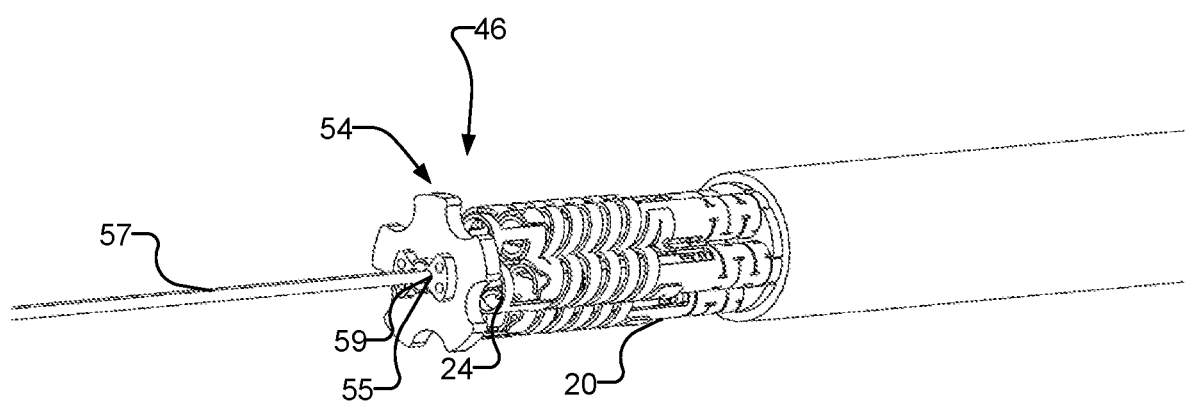
FIG. 10 is a perspective view of the apparatus of FIG. 1, showing each one of the plurality of arms in a collapsed configuration with a tether extending through a hole of the plate of the tip protector.

As best shown in FIG. 10, in some embodiments, the plate 54 defines one or more holes 55 dimensioned to allow one or more tethers or guidewires 57 to extend therethrough. The one or more holes 55 may comprise at least one hole being positioned at a center 59 of the plate 54.

The apparatus 10 may optionally include an arm sleeve 62 mountable over at least a portion of the steering arm 20 along its longitudinal length. In some embodiments, the arm sleeve 62 is arranged to mount over a distal portion 64 of the steering arm 20. The distal portion 64 is a portion along the length of the steering arm 20 which is proximal to the distal end 24 of the steering arm 20.

In some embodiments, the length of the first supporting arm 18 is shorter than the length of the arms 20 and/or the second supporting arm 50. In some embodiments, the lengths of the arms 20 are substantially the same as each other. In some embodiments, the length of the second supporting arm 50 is substantially the same as the lengths of the arms 20.

In some example embodiments (see FIG. 11), the apparatus 10 includes five arms 20 arranged around the first supporting arm 18. In some embodiments, the second supporting arm 50 and the five arms 20 are circumferentially arranged around the first supporting arm 18. In such embodiments, a second supporting arm 50 is not present. The apparatus 10 may however comprise any number of arms 20. The number of arms 20 to include in the apparatus 10 may depend on factors such as the size and/or other characteristics of the implantation site, the type of biocompatible material, the number of biocompatible materials to deliver, the intended purpose or use of the biocompatible materials, etc.

In some embodiments, the first supporting arm 18, the arms 20 and/or the second supporting arm 50 is made of a shape memory alloy. An example of a suitable shape memory alloy that can be used is Nitinol.

In some embodiments, the first supporting arm 18, the arms 20 and/or the second supporting arm 50 are fixedly secured to the distal end 16 of the body 12, for example by welding the proximal ends of each of the arms 18, 20, 50 thereto. In some example embodiments, proximal ends of the first supporting arm 18 and/or arms 20 and/or second supporting arm 50 are welded to a distal plate 15 positioned at the distal end 16 of the body 12.

Figure 3A:
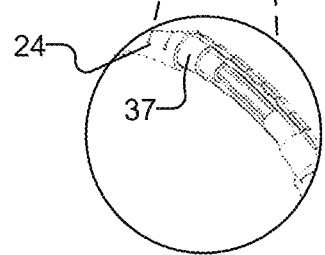
FIG. 3A is a partial cutaway view of the area indicated by the circle in FIG. 3.
Figure 4:
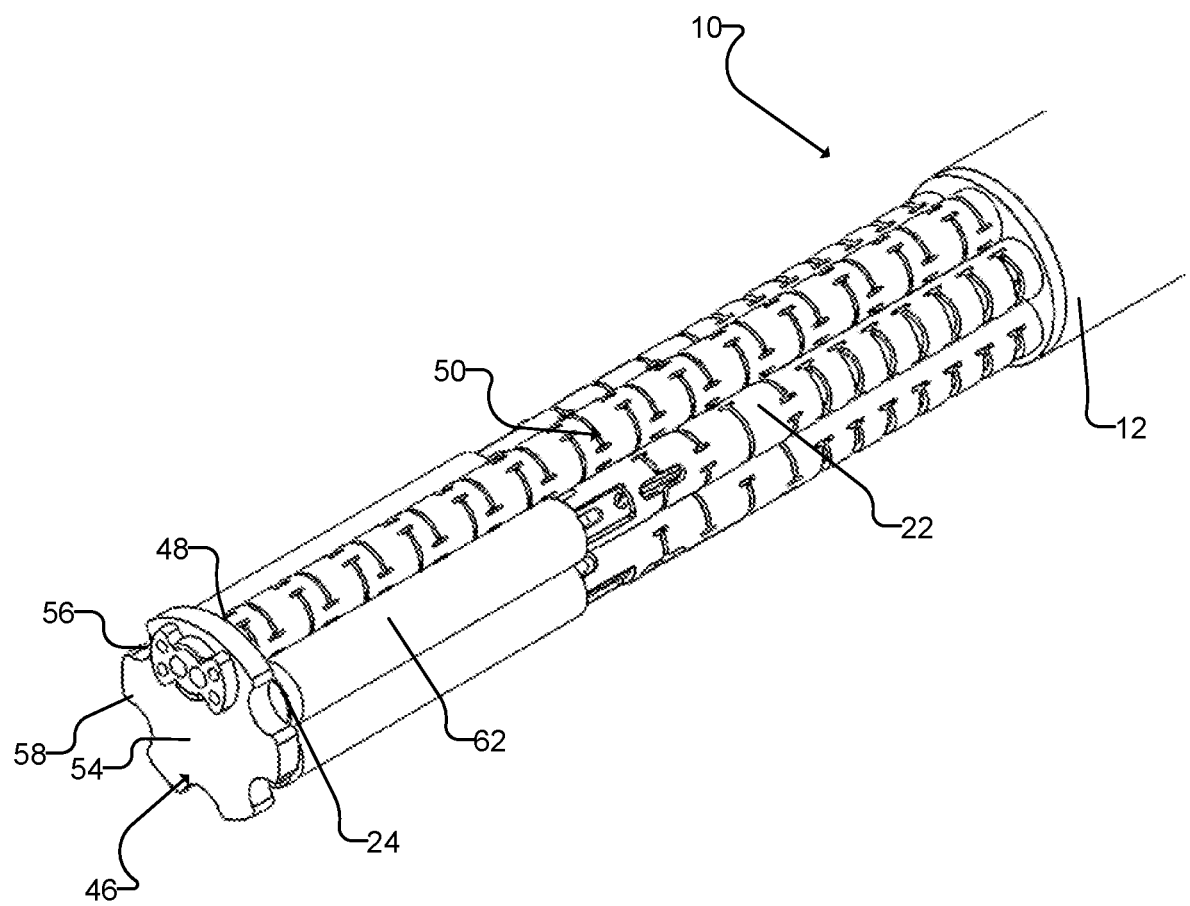
FIG. 4 is a perspective view of the apparatus of FIG. 1, showing each one of the plurality of arms in a collapsed configuration.

In some embodiments, the first supporting arm 18 and/or second support arm 50 (if present) is welded to the distal plate 15. As shown in FIGS. 3 and 3A, one or more arms 20 may each be connected to a catheter 37. The catheters 37 may be housed within the body 12. Each of the catheters 37 may be selectively moveable within the body 12 so as to selectively move the arms 20 relative to a longitudinal axis of the body 12. In some embodiments, means are provided to selectively move each one of the catheters 37 within the body 12 along a longitudinal axis thereof. The means may comprise a controller. The controller may for example be arranged near the proximal end of the body 12. In embodiments in which the means to selectively move the arms 20 comprises catheters 37, the arms 20 may be advanced longitudinally distally beyond the tip protector 46. In such embodiments, radial expansion of the one or more arms 20 relative to the longitudinal axis of the body 12 exposes the bend section 36 of the respective one of the arms 20. Radial compression of the one or more arms 20 relative to the longitudinal axis of the body 12 may retract the respective one of the arms 20 within the body 12.

In some embodiments, means are provided to control movement of the arms 20. In some embodiments, the means comprises a distal plate 15 arranged at the distal end 16 of the body 12. The distal plate 15 may be arranged to restrict further proximal movement of the arms 20 beyond the distal end 16 of the body 12.

FIGS. 12 to 18B illustrate another embodiment of the invention. In such embodiments, the apparatus 100 comprises an elongated body 102 having a proximal end (not shown) extending to an opposing distal end 106 along a longitudinal axis of the apparatus 100. The body 102 may be tubular and/or made of a flexible material. In some embodiments, a lumen 103 is defined within the body 102. In some embodiments, a portion of the body 102 is received within a lumen of an outer body.

A supporting arm 108 may be arranged within the lumen 103 of the body 102. The supporting arm 108 may extend outwardly from the distal end 106 of the body 102, terminating at a distal end 109 of the supporting arm 108. The distal end 109 of the supporting arm 108 is positioned away from the distal end 106 of the body. In some embodiments, a distal cap 115 is arranged at the distal end 109 of the supporting arm 108. In some example embodiments, the distal cap 115 is welded, adhered or otherwise joined to the distal end 109 of the supporting arm 108.

A plurality of arms 120 may be arranged within the lumen 103 of the body 102. The plurality of arms 120 may extend outwardly from the distal end 106 of the body 102, terminating at a distal end 124 thereof. The distal end 124 of each of the plurality of arms 120 is positioned away from the distal end 106 of the body 102. The arms 120 may be positioned spaced-apart from each other and from the supporting arm 108. In some embodiments, the supporting arm 108 comprises a length substantially equal to a length of each of the arms 120.

In some embodiments, the arms 120 are arranged around the supporting arm 108. The arms 120 may be spaced circumferentially apart from each other, and radially outwardly from the supporting arm 108. In some embodiments, the supporting arm 108 is aligned coaxial with respect to the body 102 along a central longitudinal axis of the body 102.

Each one of the plurality of arms 120 may define an arm lumen 126 within the arm 120. The arm lumen 126 is dimensioned to receive one or more biocompatible materials 28. Non-limiting examples of biocompatible materials 28 that may be received within the arm lumen 126 have been described elsewhere herein.

Means may be provided to selectively move each one of the plurality of arms 120 between an expanded configuration and a collapsed configuration relative to the longitudinal axis of the supporting arm 108. Each one of the plurality of arms 120 may be moved to expand or collapse individually (see e.g., FIG. 13). Alternatively, more than one of the plurality of arms 120 may be moved to expand or collapse simultaneously (see e.g., FIG. 12). Each of the plurality of arms 120 may move between a radially expanded configuration in which the arm 120 extends radially outwardly from the longitudinal axis of the supporting arm 108 and a radially collapsed configuration. A movement of each of the plurality of arms 120 between the collapsed configuration and the expanded configuration defines a change in radial distance between the longitudinal axes of the supporting arm 108 and the respective one of the plurality of arms 120. When the arm 120 is in a fully expanded configuration, the arm 120 is positioned at a point defined by a maximum radial distance from the longitudinal axis of the steering arm 120 to the longitudinal axis of the supporting arm 108 (see e.g., FIG. 12). When the steering arm 120 is in a fully collapsed configuration, the arm 120 is positioned at a point defined by a minimum radial distance from the longitudinal axis of the arm 120 to the longitudinal axis of the supporting arm 108 (see e.g., FIG. 14). Each of the arms 120 may be expanded to any point between the minimum and maximum radial distances. In some example embodiments, the maximum radial distance is in the range of from about 30° to about 90°, or in the range of from about 40° to about 80°, or in the range of from 50° to 60°. In some example embodiments, the minimum radial distance is zero or close to zero. In example embodiments, the arm 120 is expanded from about 0° to about 50°.

The one or more plurality of arms 120 may be bendable. In some embodiments, one or more of the plurality of arms 120 comprise a curved portion 136. In such embodiments, the arm 120 extends distally from a first straight portion 135 to the curved portion 136, and therefrom extends distally to a second straight portion 138 towards the distal end 124 of the steering arm 120. The degree of curvature of the curved portion 136 is at a maximum when the arm 120 is in the fully expanded configuration. When the arm 120 is in the fully collapsed configuration, the degree of curvature of the curved portion 136 is close to zero.

in some embodiments, the means to selectively move each one of the plurality of arms 120 comprises an arms actuator positioned near or at the proximal end of the apparatus 100. The arms actuator may be connected to each of the arms 120, configured to control the selective movement of each one of the arms 120 independently along the longitudinal axis of the body 106. The arms actuator may be configured to selectively move the respective one of the arms 120 to the collapsed configuration by moving the arm 120 proximally along the longitudinal axis of the body 102. The arms actuator may be configured to selectively move the respective one of the arms 120 to the expanded configuration by moving the arm 120 distally along the longitudinal axis of the body 102.

Figure 17A:
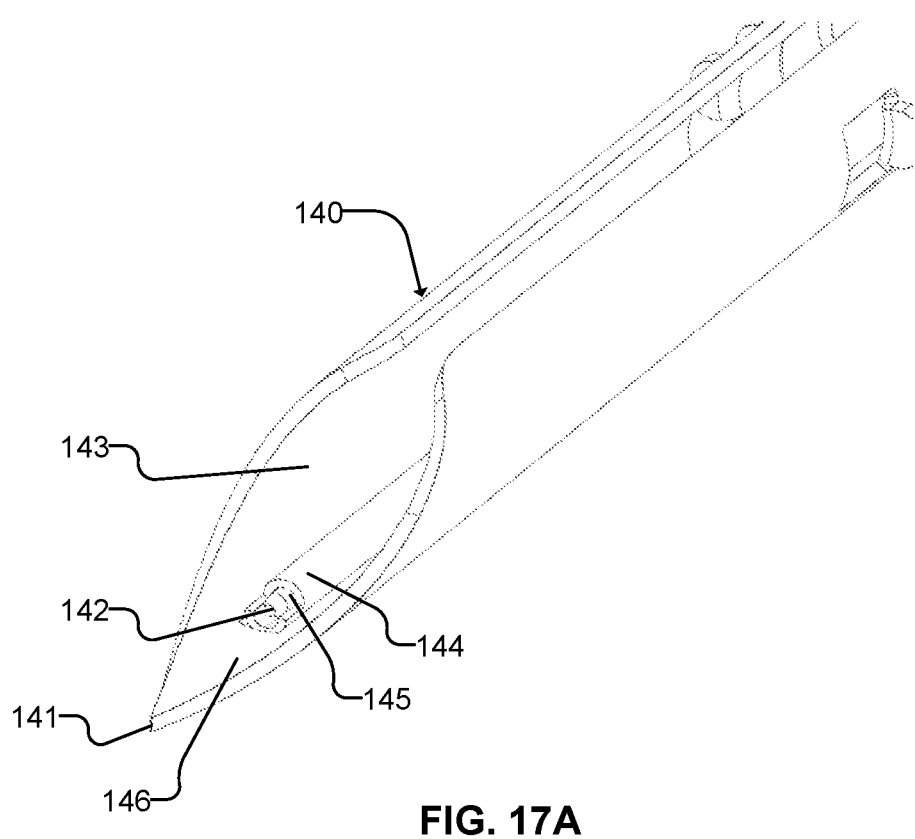
FIG. 17A is a perspective, close-up, view illustrating a wire retracted within a needle of the apparatus of FIG. 12.
Figure 17B:
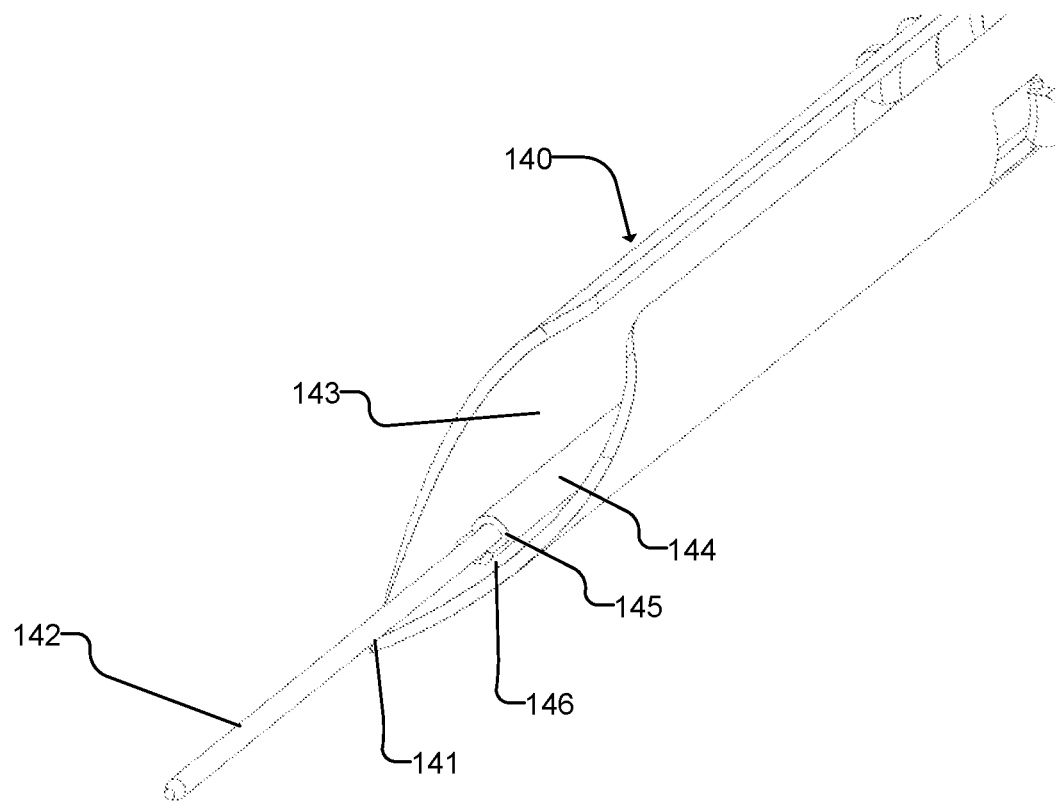
FIG. 17B is a perspective, close-up, view illustrating a wire extended from within a needle of the apparatus of FIG. 12.

In some embodiments, a needle 140 is disposed within the arm lumen 126 of one or more of the plurality of arms 120. FIGS. 17A and 17B are close-up views of a needle 140 according to an example embodiment. The needle 140 may be deployable from within the arm lumen 126. In some embodiments, the needle 140 terminates in a needle tip 141, arranged to protrude distally away from the distal end 124 of the steering arm 120 upon deployment. In such embodiments, the one or more biocompatible materials 28 may be deployable from the needle 140. The one or more biocompatible materials 28 are arranged to protrude distally away from the needle tip 141 upon deployment.

As best illustrated in FIGS. 17A and 17B, in some embodiments, a wire 142 is arranged to extend within an inner channel 143 of the needle 140 along a longitudinal axis thereof. The wire 142 may be moveable between a retracted position (FIG. 17A) and an advanced position (FIG. 17B). In the retracted position, the wire 142 may be positioned proximal to the needle tip 141. In the advanced position, the wire 142 may be positioned distally outwardly away from the needle tip 141.

In some embodiments, a wire guide 144 is arranged to extend within the inner channel 143 of the needle 140. The wire guide 144 may terminate in a distal end 145. The distal end 145 of the wire guide 144 may be positioned proximal to the needle tip 141. A lumen may be defined within the wire guide 144. The lumen may be dimensioned to receive the wire 142. The wire 142 may be insertable within the lumen of the wire guide 144, and may be moveable therein along the longitudinal axis thereof between the retracted and advanced positions. In some embodiments, the wire guide 144 is positioned adjacent or on an inner wall 146 defined by the inner channel 143 needle 140. The wire 142 may facilitate the precise positioning of the needle 140 and/or needle tip 141, and/or the precise delivery of the one or more biocompatible materials 28 to the desired implantation location(s) within the tissues of a subject. For example, a suitable imaging device (e.g., an X-ray imaging apparatus) may be used to view the apparatus 100 during advancement into a subject. The wire 142 may be visible on the imaging device. The wire 142 may be advanced to inform the user the projected trajectory of the needle 140. In use, the wire 142 is advanced and retracted before deployment of the needle 140. A suitable wire 142 comprises an outer diameter which has a size that is sufficiently small to prevent trauma or injury to the tissue upon piercing.

Similar to the FIGS. 1-11 embodiments, means may be provided to selectively deploy the needle 140 and/or biocompatible material 28 from within one or more of the arm lumens 126 of the arm 120 into a tissue of a subject. The needle 140 and the biocompatible material 28 may be deployed simultaneously or sequentially. In some embodiments, the needle 140 is deployed before the biocompatible material 28. Such deployment means may for example comprise a mechanical deployment mechanism. In some embodiments, the mechanical deployment mechanism is connectable to a control device such as a monitor and/or processor for monitoring and/or controlling the deployment. The control device may be positioned at or near the proximal end of the apparatus 100. In some embodiments, the mechanical deployment mechanism comprises a needle actuator. The needle actuator may be controlled by the control device. In some embodiments, actuation of the actuator advances the needle 140 and the biocompatible material 28 from within one or more of the arm lumens 126.

Means may be provided to control the depth of protrusion of the needle 140. Such means may comprise means to restrict movement of the needle 140 within the arm lumen 126 so as to prevent the needle 140 from being protruded beyond a selected depth. The depth controlling means provided in the FIGS. 12-18B embodiments may in some embodiments be the same as those discussed in relation to FIGS. 1-11, as best shown in FIGS. 8A and 8B, and thus will not be repeated for brevity.

Similarly, an alignment slot may be defined along the needle 140 dimensioned to receive one or more of the biocompatible materials 28. The alignment slot of the needle 140 provided in the FIGS. 12-18B embodiments may in some embodiments be the same as those discussed in relation to FIGS. 1-11, as best shown in FIGS. 9A and 9B, and thus will not be repeated for brevity.

Figure 18A:
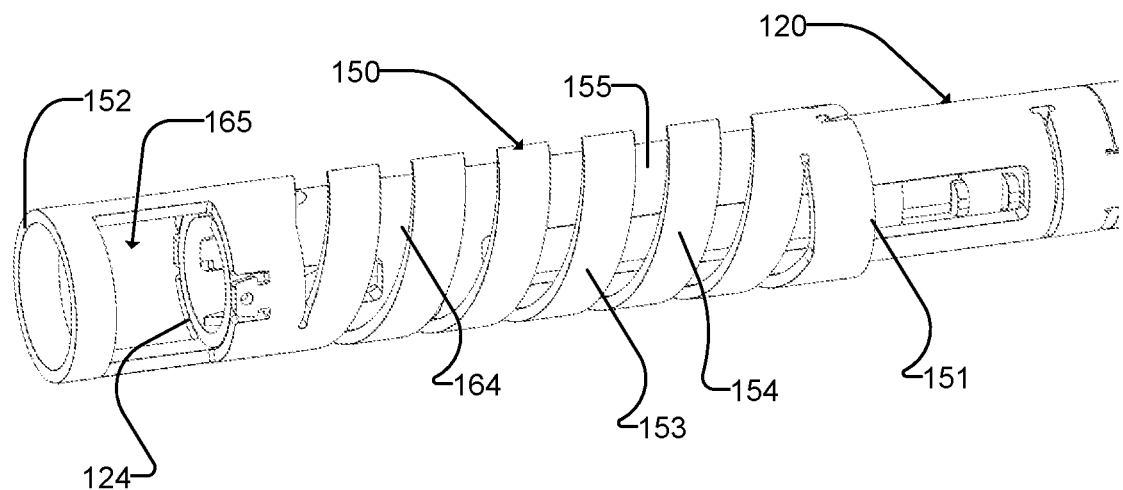
FIG. 18A is a perspective, close-up, view illustrating a tip mounted over an arm of the apparatus of FIG. 12, wherein the opening defined on a surface of the tip is in an open position.
Figure 18B:
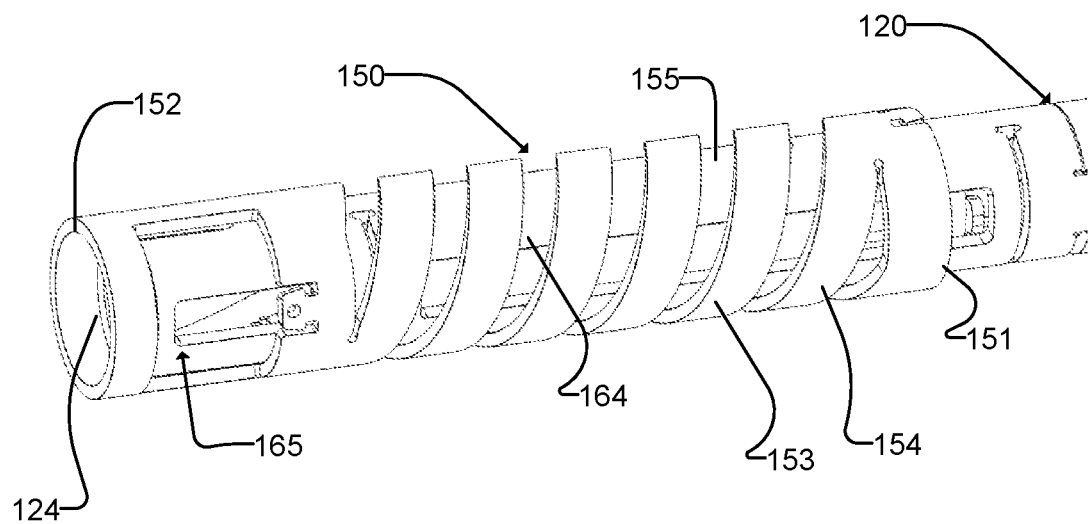
FIG. 18B is a perspective, close-up, view illustrating the tip mounted over the arm of the apparatus of FIG. 12, wherein the opening defined on the surface of the tip is in a closed position.

Referring to FIGS. 18A and 18B, the apparatus 100 may further comprise a tip 150 extending from a proximal end 151 to an opposing distal end 152. The tip 150 may comprise a tubular body 153 having a circumferential surface. In some embodiments, the body 153 comprises a plurality of helical segments 154. A plurality of gaps 155 may each separate adjacent helical segments 154.

The tip 150 may be hollow, defining a lumen therewithin. The tip 150 may be mountable over at least a portion of the arm 120 along the longitudinal length of the arm 120. In some embodiments, the tip 150 is arranged to mount over a distal portion 164 of the arm 120. The distal portion 164 is a portion along the length of the arm 120 which is proximal to the distal end 124 of the arm 120. In some embodiments, at least one opening 165 is defined on the surface of the tip 150, positioned proximal to the distal end 152. In some embodiments, the tip 150 is defined by a first opening 165A and a second opening 165B. The first and second openings 165A,B may be positioned to face one another. The first and second openings 165A,B may in some embodiments be positioned at diametrically opposing circumferential surfaces of the tip 150 (see e.g., FIG. 16).

The tip 150 may be compressible between a compressed configuration and a relaxed configuration. In the relaxed configuration, the at least one opening 165 may be in an open position such that the distal portion 164 of the arm 120 is not visible through the least one opening 165. In some embodiments, the distal end 124 of the arm 120 is positioned proximal to the at least one opening 165 when the opening 165 is in the open position. In some embodiments, when the tip 150 is in the compressed configuration, the distal end 152 of the tip 150 is moved proximally towards the distal end 124 of the arm 120. In the compressed configuration, the at least one opening 165 may be in a closed position. In such position, the distal portion 164 of the arm 124, or at least a portion of the distal portion 164, may be visible through the at least one opening 165. The change in position of the at least one opening 165 between the open and closed positions may be visible on an imaging device (e.g., an X-ray imaging apparatus). Such change may be used as a visual guide to inform the user the degree of compression of the tip 150, and in particular, whether the tip 150 has been sufficiently compressed to allow for safe deployment of the needle 140.

Figure 13:
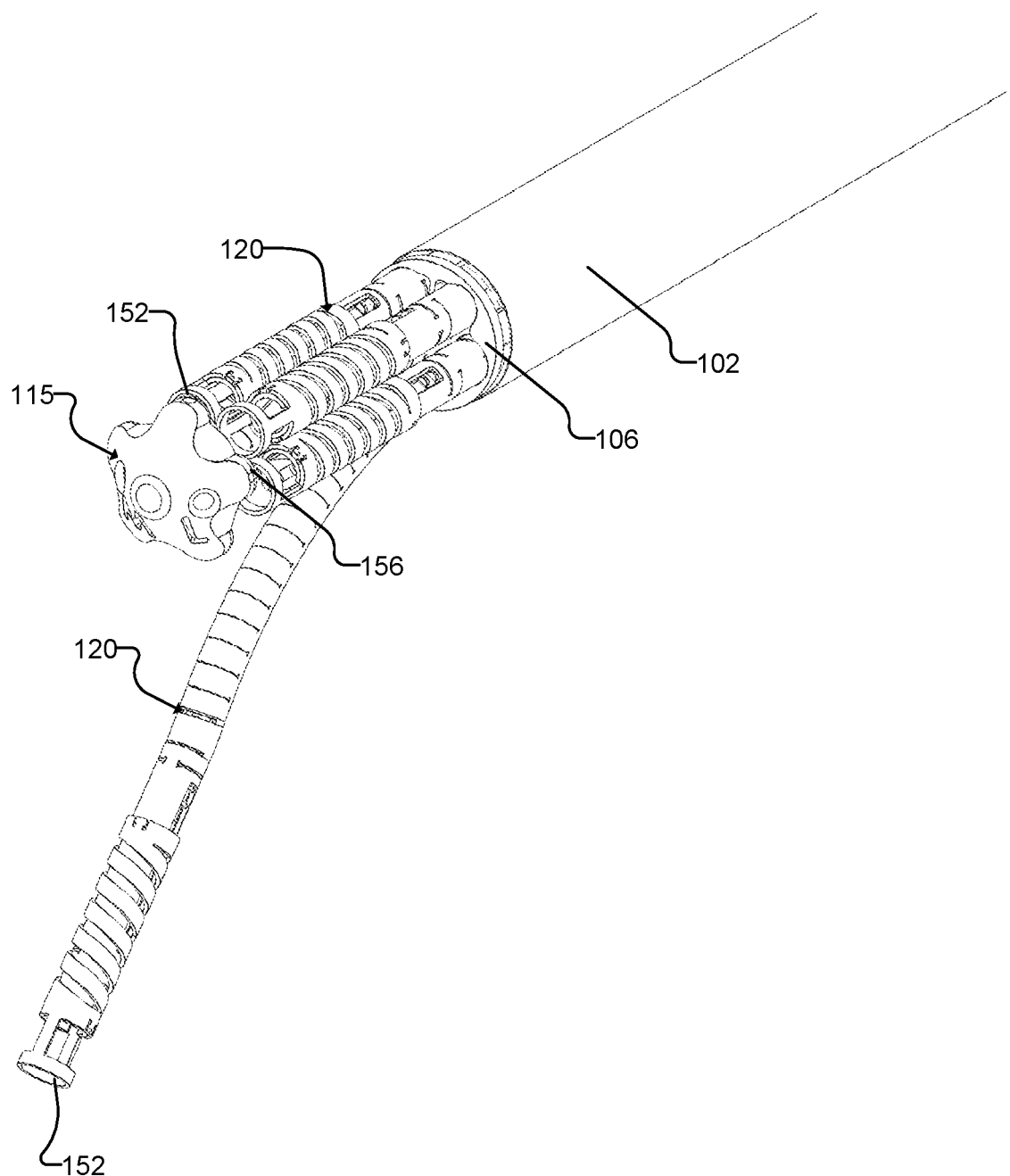
FIG. 13 is a perspective view of the apparatus of FIG. 12, showing one of the plurality of arms in the expanded configuration.
Figure 14:
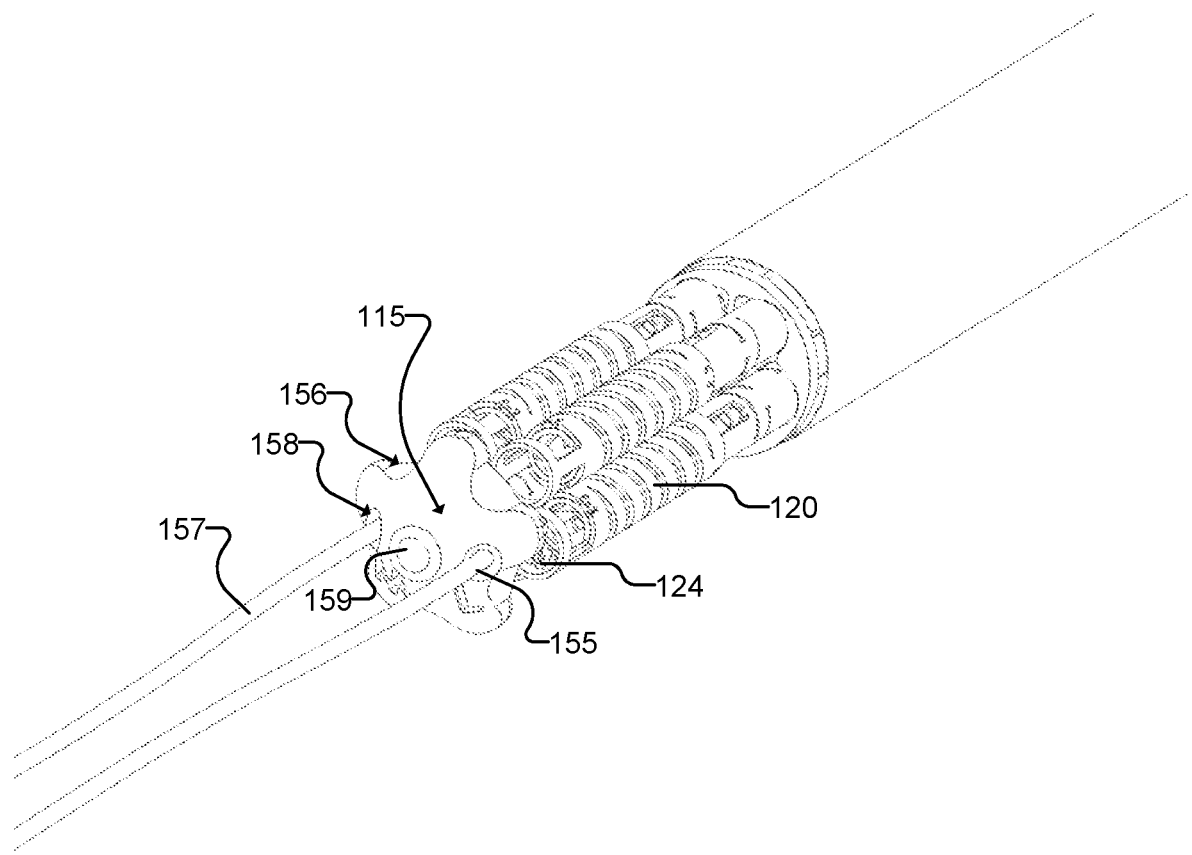
FIG. 14 is a perspective view of the apparatus of FIG. 12, showing each of the plurality of arms in a collapsed configuration.
Figure 15:
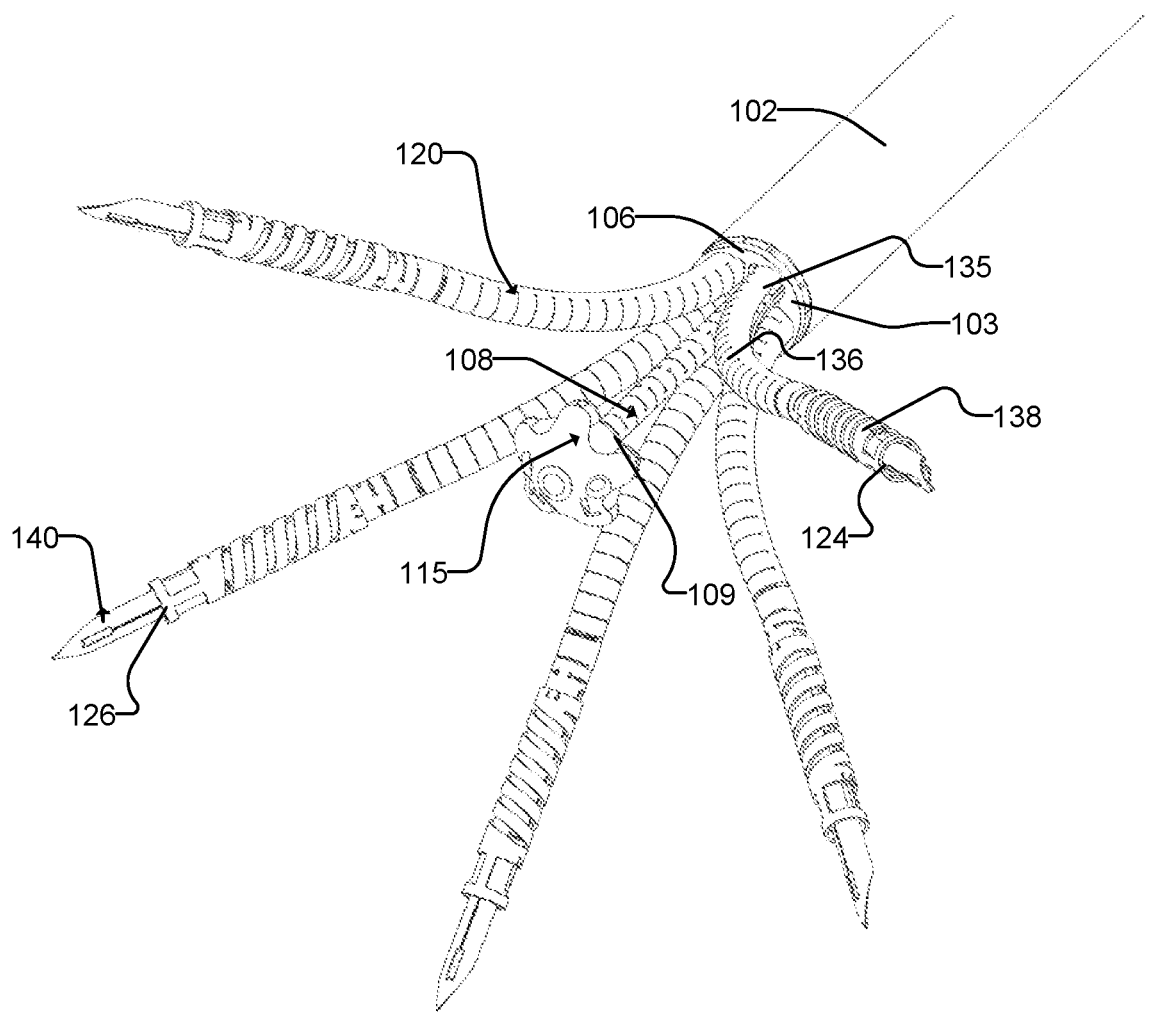
FIG. 15 is a perspective view illustrating the apparatus of FIG. 12 showing each one of the plurality of arms in the expanded configuration with a needle deployed from within each of the arm lumens.
Figure 16:
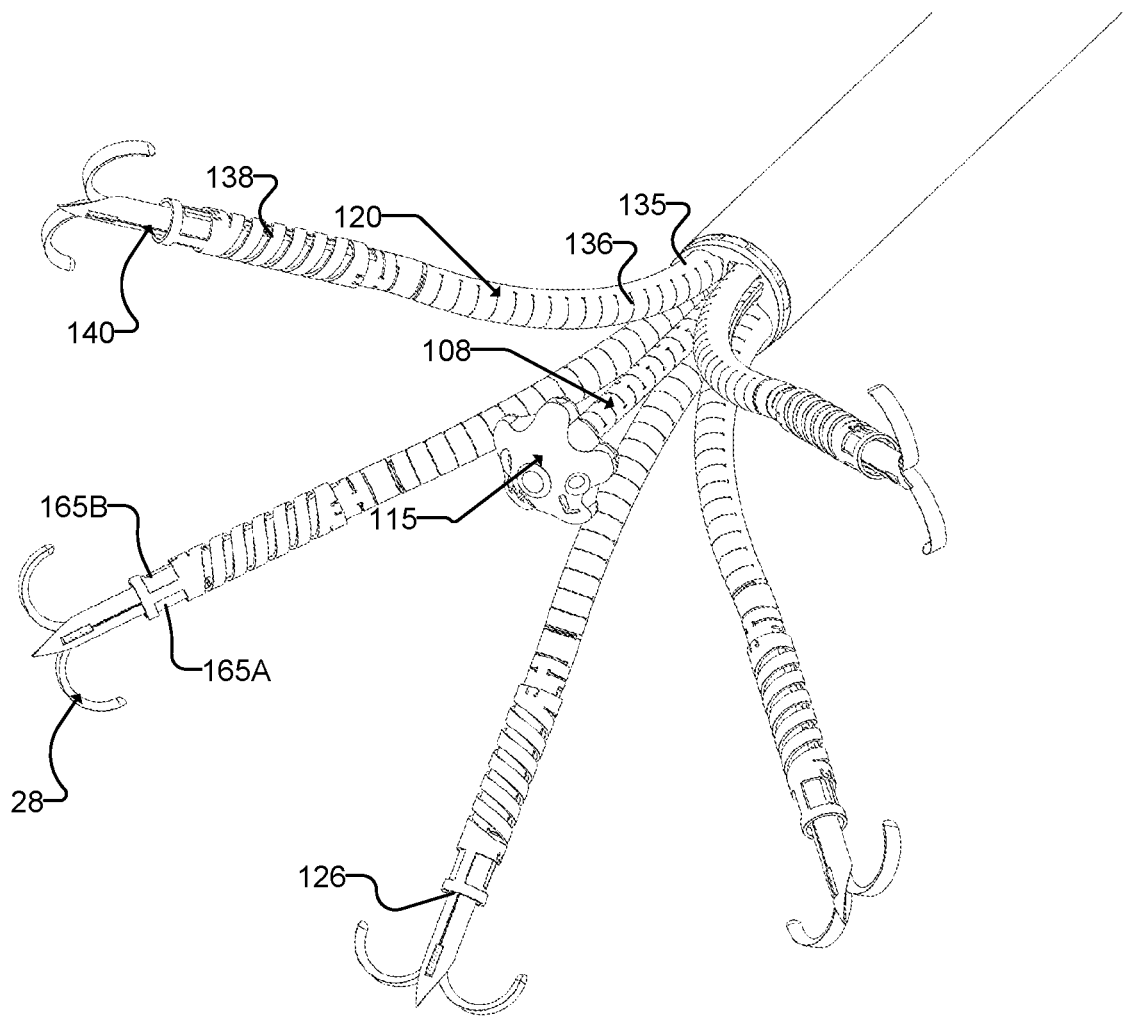
FIG. 16 is a perspective view illustrating the apparatus of FIG. 12 showing each one of the plurality of arms in the expanded configuration with a needle and a biocompatible material deployed from within each of the arm lumens.

The distal cap 115 may be arranged to provide a cover for the distal ends 124 of each one of the arms 120 when the arm 120 is in the fully compressed configuration (see e.g., FIGS. 13 and 14). The distal cap 115 may be positioned to contact the distal end 124 of the arm 120, or positioned spaced-apart distally from the distal end 124 of the arm 120.

In some example embodiments, the distal cap 115 defines one or more end-receiving slots 156. Each one of the end-receiving slots 156 are dimensioned to align or orient a distal end 124 of the respective one of the arms 120. In some embodiments, each one of the end-receiving slots 156 are dimensioned to receive a distal end 124 of the respective one of the arms 120 (see FIGS. 12-14).

Referring to FIG. 14, the distal cap 115 may further define one or more holes 158 dimensioned to allow one or more tethers or guidewires 157 to extend therethrough.

In some examples embodiments, the distal cap 115 comprises a cone shape; however, the distal cap 115 may comprise any other suitable shapes. The distal cap 115 may comprise round outer edges.

In some example embodiments (see FIG. 12), the apparatus 100 comprises five arms 120 arranged around the supporting arm 108. The apparatus 100 may however comprise any number of arms 120. The number of arms 120 to include in the apparatus 100 may depend on factors such as the size and/or other characteristics of the implantation site, the type of biocompatible material, the number of biocompatible materials to deliver, the intended purpose or use of the biocompatible materials, etc.

In some embodiments, the supporting arm 108, the arms 120 and/or the tip 150 is made of a shape memory alloy. An example of a suitable shape memory alloy that can be used is Nitinol™.

In some embodiments, the supporting arm 108 and/or the arm 120 each comprises a tubular body 108B, 120B. The tubular bodies 108B, 120B of the supporting arm 108 and the arm 120 may be defined by a plurality of slots 108C, 120C on the outer circumferential surfaces 108D, 120D of the bodies 108B, 120B. The plurality of slots 108C, 120C may be arranged spaced-apart from one another.

In some embodiments, means are provided to selectively move each one of the arms 120 within the lumen 103 of the body 102 along a longitudinal axis thereof. The means may comprise a controller. The controller may for example be arranged near the proximal end of the body 102. In some embodiments, the arms 120 may be advanced longitudinally distally beyond the distal cap 115. In such embodiments, radial expansion of the one or more arms 120 relative to the longitudinal axis of the body 102 exposes the curved portion 136 of the respective one of the arms 120. Radial compression of the one or more arms 120 relative to the longitudinal axis of the body 102 may retract the respective one of the arms 120 within the body 102.

The invention provides a method of using the apparatus 10 or the apparatus 100. An example method of use comprises delivering one or more biocompatible materials 28 to a desired implantation location within a heart of a subject. In an example embodiment, the one or more biocompatible materials comprise anchors, and in particular, ventricular anchors including annular anchors and papillary anchors. In such example embodiment, the apparatus 10, 100 is used to deliver ventricular anchors into the mitral annulus of the ventricle of the heart. One non-limiting example application of the ventricular anchors is to secure a device, such as an annuloplasty ring, to the mitral valve for repair. In some embodiments, the apparatus 10, 100 is configured to deliver ventricular anchors from the atrial aspect such that the apparatus 10, 100 is positioned in the atrium while being used to implant the anchors into the mitral annulus.

In some embodiments, the method comprises loading the biocompatible materials 28 such as ventricular anchors into the arm lumen 26, 126 of one or more of the arm 20, 120 prior to advancement into a body of a subject.

The arms 20, 120 are arranged to be in a collapsed configuration prior to advancement into the subject. In an example embodiment, the apparatus 10, 100 is advanced to the left atrium of the heart via transfemoral and/or transseptal access to reach a desired region. The desired region may be substantially above the mitral annulus within the atrium. The desired region is proximate to the desired implantation location. In some embodiments, the desired implantation location is the ventricle, and in some embodiments, the mitral annulus.

In some embodiments, the apparatus 10, 100 is advanced through an inner catheter and an outer catheter (collectively referred to as the "catheter"). The inner catheter may be received within the outer catheter. The catheter may be positioned above the mitral valve at a desired location.

Once the catheter reaches the desired location, such as above the mitral annulus, and/or the apparatus 10, 100 reaches the desired region, such as at the level or plane of the mitral annulus, some embodiments of the method involve outwardly extending an arm 20, 120 and optionally rotating the apparatus 10, 100 to radially align the arm 20, 120 to a desired radial location on the valve annulus. In embodiments in which a plurality of arms 20, 120 is provided, each of the arms 20, 120 is arranged to align with a respective desired radial location. Each desired radial location may be one specific anatomic site on the valve annulus. The specific anatomic sites may be radially equidistant from each other. In such embodiments, the catheter remains substantially at the desired location while the arms 20, 120 are being moved to extend outwardly to each of the specific anatomic sites on the valve annulus. In some embodiments, the specific anatomic sites is at or near the desired implantation locations.

When the distal end 24, 124 of the arm 20, 120 is positioned near or at the specific anatomic site and/or the desired implantation location, in embodiments in which the apparatus 100 comprises a wire 142 extending through the needle 140, the wire 142 may first be advanced into the tissue to inform the user, via an imaging device, the projected trajectory of the needle 140. When the user agrees with the projected trajectory, the wire 142 may be retracted.

In some embodiments, the tip 150 is compressed to move the tip 150 into the compressed configuration before deployment of the needle 40, 140. The change in position of the at least one opening 165 between the open and closed positions may be visible on the imaging device to inform the user as to whether the tip 150 has been sufficiently compressed to allow for safe deployment of the needle 140.

The needle 40, 140 may be deployed from the arm 20, 120 into the tissue at the specific anatomic site. The needle 40, 140 may be fully embedded into the tissue. In some embodiments, the depth within which the needle 40, 140 is advanced into the tissue is limited by the abutment 42 within the body 34, 120B of the arm 20, 120 and the corresponding slot in the needle 40, 140. In some embodiments, the deployment of the needle 40, 140 comprises deploying the needle 40, 140 and the biocompatible material 28 simultaneously. The depth within which the biocompatible material 28 is advanced into the tissue may be determined by the depth within which the needle 40, 140 is advanced into the tissue. In some embodiments, the biocompatible material 28 is an anchor which may optionally include an attached tether and guidewire dimensioned to traverse the vasculature to an external of a subject.

After the biocompatible material is delivered to the specific anatomic site, the needle tip 41, 141 may be retracted into the arm lumen 26, 126. The steering arm 20, 120 may then be moved to the compressed configuration.

In some embodiments, each of the plurality of arms 20, 120 is arranged to sequentially move between the expanded configuration and the compressed configuration. In such embodiments, each of the arms 20, 120 is selectively moved from the compressed configuration to the expanded configuration for deployment of the biocompatible material at the respective specific anatomic site at each time point. The biocompatible material is, in such embodiments, advanced into each specific anatomic site sequentially, one at a time.

In some embodiments, more than one of the plurality of arms 20, 120 are arranged to move between the expanded configuration and the compressed configuration. In such embodiments, two or more arms 20, 120 are selectively moved to the expanded configuration at each time point. Biocompatible materials may, in such embodiments, be advanced into more than one specific anatomic site at each time point.

Once the biocompatible materials are delivered to the specific anatomic sites, all of the arms 20, 120 may be returned to the fully compressed configuration. The apparatus 10, 100 may then be withdrawn from the body of the subject.

The advancement of the apparatus to the desired region and/or implantation location may be guided by echocardiography.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. An apparatus for the delivery of biocompatible materials, comprising:
   a body having a proximal end and an opposing distal end;
   a supporting arm extending outwardly from the distal end of the body;
   a plurality of arms each extending outwardly from the distal end of the body, from a proximal end of the plurality of arms terminating at a distal end thereof, positioned spaced-apart from the supporting arm, each one of the plurality of arms having an arm lumen defined within each of the arms, the arm lumen being dimensioned to receive the biocompatible materials therein, wherein each one of the plurality of arms is selectively moveable between an expanded configuration and a collapsed configuration relative to a longitudinal axis of the supporting arm; and
   a plurality of catheters each connected to one of the plurality of arms, wherein each one of the plurality of catheters is selectively moveable within the body so as to selectively move a respective one of the plurality of arms between the expanded and collapsed configurations, wherein the plurality of catheters is configured to selectively move each individual one of the plurality of arms between the expanded and collapsed configurations,
   a controller configured to selectively move each one of the plurality of catheters within the body,
   wherein the biocompatible materials are deployable from within a selective one or more of the arm lumens of the respective one or more of the plurality of arms into a tissue of a subject.

2. The apparatus according to claim 1, wherein each one of the plurality of arms and the supporting arm are arranged to extend through a lumen defined within the body.

3. The apparatus according to claim 1, wherein the plurality of arms is arranged around the supporting arm.

4. The apparatus according to claim 3, wherein the supporting arm is coaxially aligned with the body along a central longitudinal axis of the apparatus.

5. The apparatus according to claim 1, further comprising:
   a needle disposed within each one of the arm lumens, the needle being selectively deployable from within a selective one or more of the arm lumens through the distal end of the respective one or more of the plurality of arms.

6. The apparatus according to claim 5, further comprising:
   a wire guide extending through an inner channel of the needle;
   a wire extending within a lumen defined within the wire guide, the wire being moveable between an advanced position and a retracted position.

7. The apparatus according to claim 5, wherein each one of the arms defines an abutment shape to engage with the needle, the abutment being arranged to restrict movement of the needle within the arm lumen along the longitudinal axis of the respective one of the arms.

8. The apparatus according to claim 7, wherein a slot is positioned proximal to the distal end of the respective one of the plurality of arms.

9. The apparatus according to claim 1, further comprising a compressible tip having a hollow tubular body extending from a proximal end to an opposing distal end, wherein the tip is arranged to mount over a distal portion of a respective one of the arms.

10. The apparatus according to claim 9, wherein at least one opening is defined on a surface of the body of the tip positioned near the distal end of the body of the tip.

11. The apparatus according to claim 1, wherein the respective one of the plurality of arms extends distally from a first straight portion to a curved portion, and therefrom continues to extend distally to a second straight portion in the expanded configuration.

12. The apparatus according to claim 1, wherein a movement of each of the plurality of arms between the collapsed configuration and the expanded configuration defines a change in radial distance between the longitudinal axes of the supporting arm and the respective one of the plurality of arms.

13. The apparatus according to claim 12, wherein the radial distance is at a minimum when the respective one of the plurality of arms is in a fully collapsed configuration, and is at a maximum when the respective one of the plurality of arms is in a fully expanded configuration.

14. The apparatus according to claim 1, further comprising a distal cap joined to a distal end of the support arm, wherein the distal cap defines a plurality of slots each dimensioned to align a distal end of a respective one of the arm when the arms is in the collapsed configuration.

15. The apparatus according to claim 1, wherein the biocompatible materials are deployable from within a selective one or more of the arms lumens through the distal end of the respective one or more of the plurality of arms into the tissue of the subject.

* * * * *